(12) United States Patent
Theriault

(10) Patent No.: US 8,641,318 B2
(45) Date of Patent: Feb. 4, 2014

(54) SYSTEM AND METHOD FOR JOINING BRITTLE MATERIAL PIECES

(75) Inventor: Philip C. Theriault, Tucson, AZ (US)

(73) Assignee: Raytheon Company, Waltham, MA (US)

(*) Notice: Subject to any disclaimer, the term of this patent is extended or adjusted under 35 U.S.C. 154(b) by 1279 days.

(21) Appl. No.: 11/755,325

(22) Filed: May 30, 2007

(65) Prior Publication Data

US 2008/0298889 A1    Dec. 4, 2008

(51) Int. Cl.
*F16D 1/00*    (2006.01)

(52) U.S. Cl.
USPC .......................................................... 403/404

(58) Field of Classification Search
USPC ................ 403/231, 382, 404, 408.1
See application file for complete search history.

(56) References Cited

U.S. PATENT DOCUMENTS

| | | | |
|---|---|---|---|
| 2,787,346 A * | 4/1957 | Goeckel | |
| 3,107,950 A * | 10/1963 | Kleven | |
| 3,239,036 A * | 3/1966 | Scott | 403/408.1 |
| 3,884,002 A * | 5/1975 | Logie | 403/292 |
| 4,011,718 A * | 3/1977 | Asplund | |
| 4,039,872 A * | 8/1977 | Armor et al. | |
| 4,099,890 A * | 7/1978 | Murakami et al. | |
| 4,512,699 A * | 4/1985 | Jackson et al. | 403/408.1 |
| 4,540,304 A * | 9/1985 | Pavelka et al. | 403/404 |
| 4,981,388 A * | 1/1991 | Becken et al. | 403/382 |
| 5,131,813 A * | 7/1992 | Przytulski et al. | |
| 5,802,780 A * | 9/1998 | Hammerschlag | 403/231 |
| 6,503,020 B1 * | 1/2003 | Mascioletti et al. | 403/231 |

OTHER PUBLICATIONS

Reinhold Publishing Co., "Comparisons of Materials: Coefficient of Thermal Expansion", Reprinted with permission from "Materials Selector", Reinhold Publishing Co., Penton/IPC, 1964, 3 pages.*
Mellesgriot.com, "Zerodur: Material Properties", internet page, 1 page, found at waybackmachine site, Mar. 17, 2006.*
"The Brazing Guide: Overview", Unbiased Induction Heating Expertise, Induction Atmospheres, [retrieved on Jan. 13, 2006], <http://www.inductionatmospheres.com/brazing_overview.html>.
"Bonding via Intermediate Layers", Fusion Bonding Benefits, [retrieved on Jan. 13, 2006], <http://www.aml.co.uk/BondingIntLayers.HTM>.

* cited by examiner

*Primary Examiner* — Joshua Kennedy
(74) *Attorney, Agent, or Firm* — Renner, Otto, Boisselle & Sklar, LLP

(57) ABSTRACT

A system and method for joining together a pair of brittle material pieces, such as controlled expansion ceramic pieces, involves using a threaded plug joined to a first brittle material piece, to secure a threaded fastener passing through part of the second brittle material piece, thus joining together the brittle material pieces. The threaded plug may be inserted in a plug-receiving hole that may be substantially perpendicular to a fastener-receiving hole in the first brittle material piece. One or both of the plug and the plug-receiving hole may be conical, to facilitate fitting the plug into the plug-receiving hole. The plug may be secured to the first brittle piece by soldering. The system and method provides a secure way of threadedly joining together a pair of brittle material parts, without use of possibly contaminating adhesives, and without a need to put threads on the actual brittle material itself.

11 Claims, 4 Drawing Sheets

SYSTEM AND METHOD FOR JOINING BRITTLE MATERIAL PIECES

BACKGROUND OF THE INVENTION

1. Technical Field of the Invention

This invention relates generally to systems and methods for joining brittle material pieces.

2. Description of the Related Art

There is a continuing need to be able to join parts made of brittle materials, for applications such as the assembly of optical systems, for instance in the assembly of telescopes. Brittle materials are not well suited for having threads cut into them, to allow parts to be joined together with threaded fasteners. In the process of formation of the threads themselves, such brittle materials tend to shatter or crack. And even if the threads can be formed, local stresses can be caused in the brittle material when a mating threaded fastener (such as a screw or a bolt) is tightened. The local stresses can cause damage and possibly failure of the threaded brittle material.

One alternative to threaded fasteners has been use of adhesives to join brittle material parts. However, adhesives may have many undesirable characteristics for use in joining brittle material parts. One potential problem is that the creep in adhesives can allow the adhesively joined parts to shift relative to one another. This can result in misalignment of optical parts joined by adhesives. Another problem is that adhesives can introduce contaminants, such as molecular contaminants or moisture, that can interfere with operations of systems like optical systems.

In view of the foregoing it will be appreciated that improvements would be desirable in systems and methods of joining brittle material pieces.

SUMMARY OF THE INVENTION

According to an aspect of the invention, a method of fastening a brittle material structure includes inserting a plug in a hole in a side surface of a brittle material piece, soldering to attach the plug to the brittle material piece, and optionally tapping an internally threaded hole in the plug. The tapping may be performed by accessing the plug from a different hole other than the one into which it was inserted.

According to another aspect of the invention, a brittle material structure includes: a second brittle material piece; and a first brittle material piece fastened to the second material piece. The brittle material pieces are fastened together by a threaded fastener that passes through the second brittle material piece and threadedly engages a threaded plug in the first brittle material piece. The threaded plug is in a plug-receiving hole in the first brittle material piece. The threaded plug is fixedly attached to the first brittle material piece.

According to still another aspect of the invention, a method of joining a first brittle material piece and a second brittle material piece, includes the steps of: cutting a plug-receiving hole and a fastener-receiving hole in the first brittle material piece; inserting a plug in the plug-receiving hole; affixing the plug to the first brittle material piece; tapping an internally threaded hole in the plug; and fastening the brittle material pieces by passing a threaded fastener through the second brittle material piece, and into the fastener-receiving hole, where the threaded fastener threaded engages the internally threaded hole in the plug.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A system and method for joining together a pair of brittle material pieces, such as controlled expansion ceramic pieces, involves using a threaded plug joined to a first brittle material piece, to secure a threaded fastener passing through part of a second brittle material piece, thus joining together the brittle material pieces. The threaded plug may be inserted in a plug-receiving hole in the first brittle material piece. The plug-receiving hole may be substantially perpendicular to a fastener-receiving hole in the first brittle material piece. One or both of the plug and the plug-receiving hole may be conical, to facilitate fitting the plug into the plug-receiving hole. The plug may be made of a relatively ductile material, such as a suitable metal, that can be tapped. The tapped threaded hole in the plug may be made before or after the installation of the plug in the plug-receiving hole. The plug may be secured to the first brittle piece by a suitable attachment mechanism, such as soldering or brazing. The system and method provides a secure way of threadedly joining together a pair of brittle material parts, without use of possibly contaminating adhesives, and without a need to put threads on the actual brittle material itself. The system and method may be used to join together parts of optical devices, and may be particularly useful to join an end surface of the first brittle material piece against a major surface of the second brittle material piece.

Figure 1:
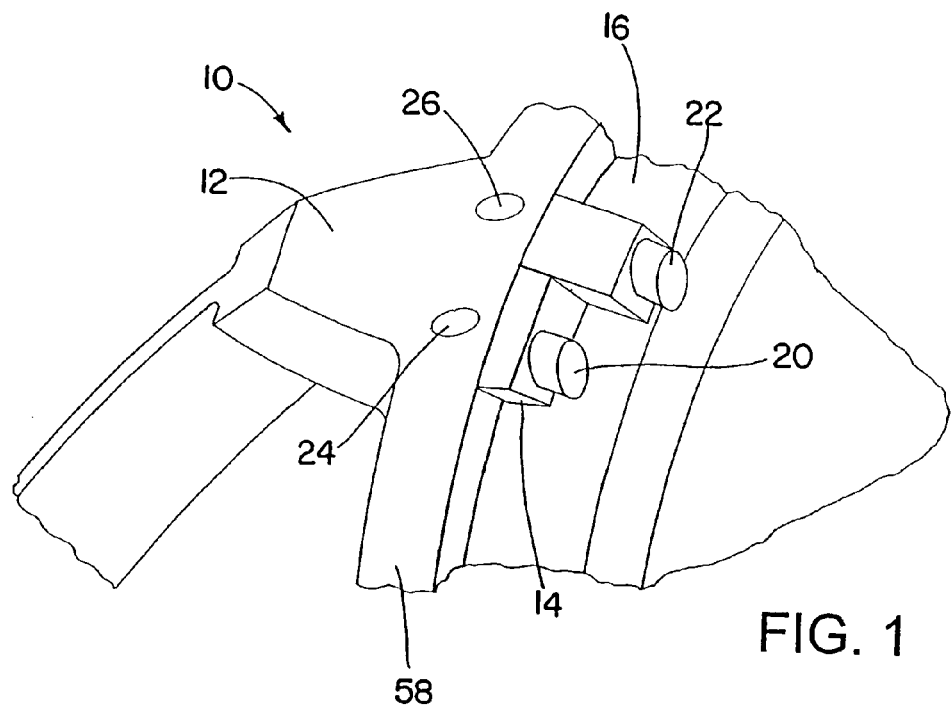
FIG. 1 shows an oblique view of joined brittle material parts of a brittle material structure, in accordance with the present invention.
Figure 2A:
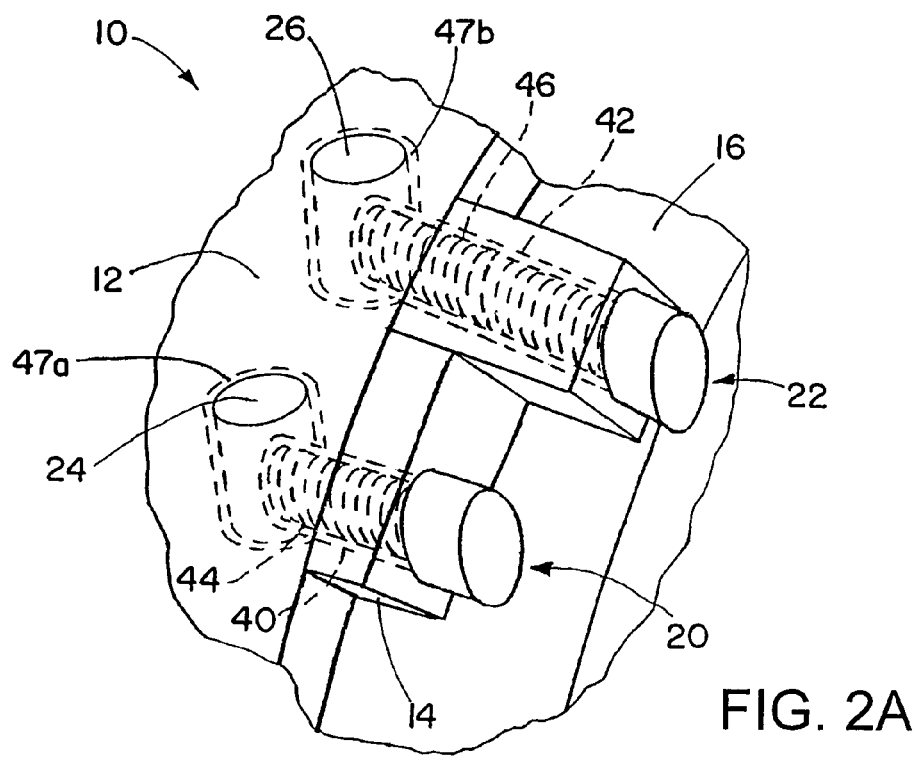
FIG. 2A shows a view of the structure portion of FIG. 1, with the brittle material pieces shown in phantom in order to better illustrate the engagement of the threaded fasteners and the plugs.
Figure 2B:
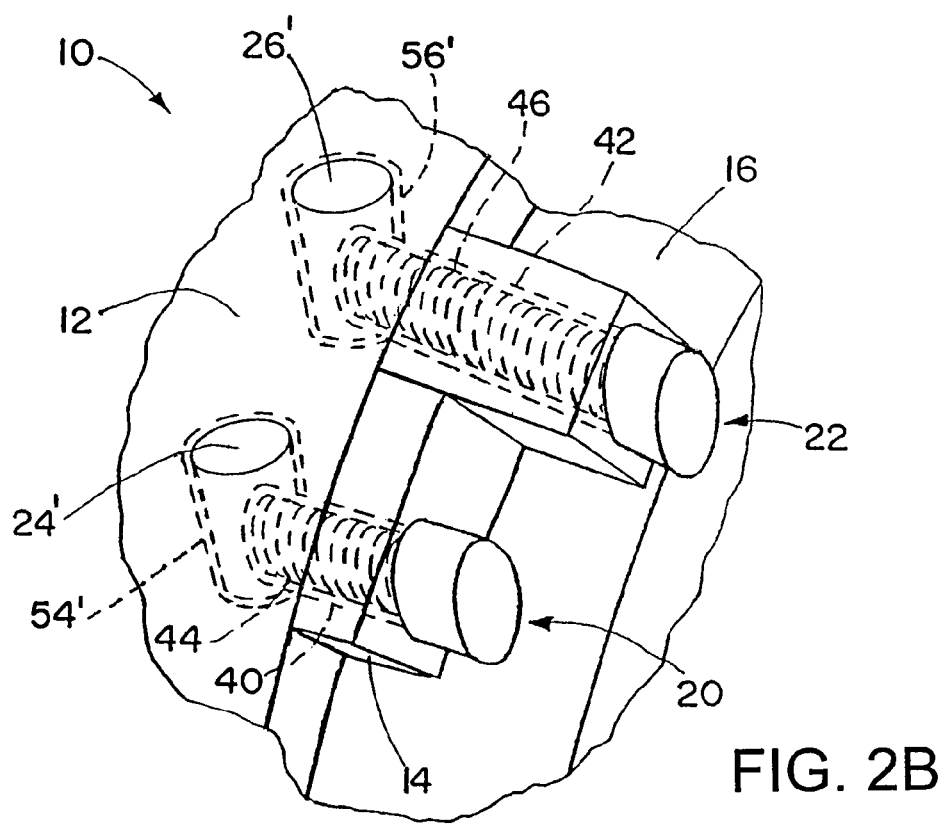
FIG. 2B shows a view of an alternative embodiment of FIG. 2A, utilizing a conical plug in a conical hole.
Figure 3:
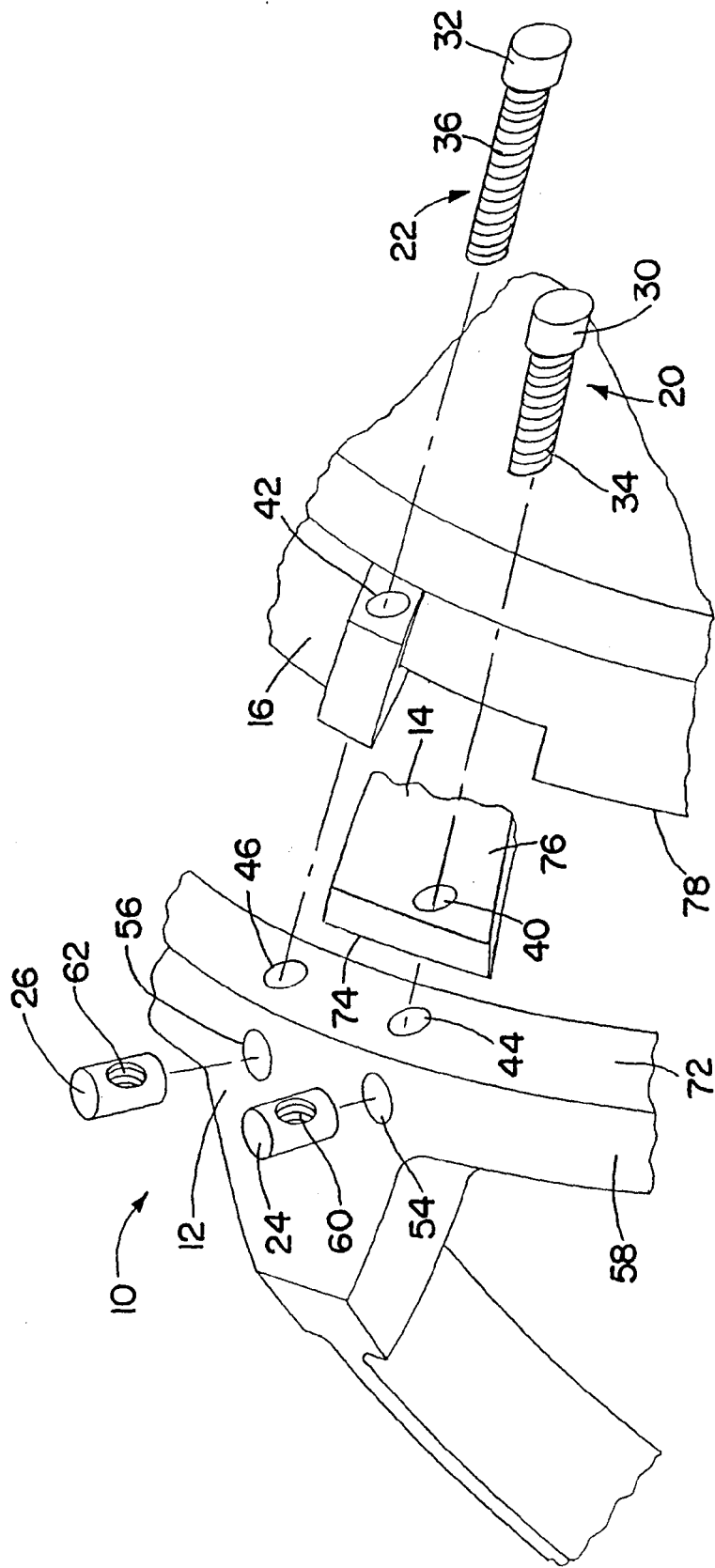
FIG. 3 shows an exploded view of the portion of the structure of FIG. 1.

Referring initially to FIGS. 1-3, a brittle material structure 10 is shown that includes a first brittle material piece 12, a second brittle material piece 14, and a third brittle material piece 16. The second and third brittle material pieces 14 and 16 are joined to the first brittle material piece 12 by use of threaded fasteners 20 and 22. The fasteners 20 and 22 pass through parts of their respective brittle material pieces 14 and 16, and threadedly engage respective threaded plugs 24 and 26 in the first brittle material piece 12.

"Brittle material," as the term is used herein, broadly refers to nonmetallic materials and intermetallics that tend to crack or shatter when worked, such as when an attempt is made to internally thread a hole in the material. Broad categories of brittle materials include nonmetallic oxides, carbides, and nitrides. Specifically excluded from the definition of brittle materials are easily worked nonmetallic materials, such as wood and plastics.

It will be appreciated that a subcategory of brittle materials are nonmetallic brittle materials. One application of the present fastening method is in joining materials used in optical systems. Such materials are referred to as controlled expansion ceramics or glass ceramics. Examples of such materials are a glass ceramic material sold under the trademark ZERODUR, ultra low expansion titanium silicate glass generally known as ULE, silicon carbide, boron carbide, and silicon.

In the illustrated embodiment, the brittle material structure 10 may be all or part of an optical device, such as a telescope. It will be appreciated that components of optical systems, such as telescopes, often have components, such as lenses and/or mirrors, that are made of brittle materials. It will be appreciated that it is often desirable to have connected parts of the optical system have similar coefficients of thermal expansion, so that changes in temperature do not cause undo stresses or shifts in alignment of equipment.

The brittle material pieces 12, 14, and 16 thus may be any of various parts of an optical system, for instance a telescope. Of course, it will be appreciated that the system 10 may be any of a variety of brittle material structures. An example of a brittle structure that is not optical equipment is a coordinate measuring machine, which includes structures made out of joined pieces of ceramic.

Moving on now to the details of the fastening between the brittle material pieces 12, 14, and 16, the threaded fasteners 20 and 22 have respective fastener heads 30 and 32, and respective fastener threaded shafts 34 and 36. The fasteners may be any type of suitable threaded fastener, such as any of a variety of bolts or screws. The shafts 34 and 36 pass through respective through-holes 40 and 42 in the second and third brittle material pieces 14 and 16. The threaded shafts 34 and 36 then pass into respective smooth fastener-receiving holes 44 and 46 in the first brittle material piece 12. In the first brittle material piece 12 the fastener threaded shafts 34 and 36 theadedly engage the threaded plugs 24 and 26.

The plugs 24 and 26 are internally-threaded pieces secured within plug-receiving holes 54 and 56 in the first brittle material piece 12. The plug-receiving holes 54 and 56 are cylindrical or conical holes in a side surface 58 of the first brittle material piece 12. The plugs 24 and 26 may be generally cylindrical in shape. The plugs 24 and 26 are secured to the first brittle material piece 12, within the plug-receiving holes 54 and 56, by a suitable attachment process, such as soldering. FIG. 2A shows solder 47a securing the plug 24 within the hole 54, and solder 47b securing the plug 26 within the hole 56. "Soldering," as the term is used herein, broadly includes elevated-temperature processes where a pair of pieces are joined by melting and re-solidifying a material between them. The term "soldering" is expressly intended to include high-temperature processes such as brazing.

In attaching the plugs 24 and 26 to the first brittle material piece 12 by soldering, any of a variety of suitable kinds of solder may be employed. Desirable properties of the solder include low temperature and high strength. The solder also desirably wets the materials of the plugs 24 and 26 and the first brittle material piece 12. One type of solder that has been found suitable is gold-tin solder having 80% gold and 20% tin. Other types of available solder, such as lead-tin solder and silver-tin solder, may also be usable.

The plug-receiving holes 54 and 56, and/or the plugs 24 and 26, may be conical, with a slight taper along their cylindrical sides. The embodiment illustrated in FIG. 2A shows the plug-receiving holes 54 and 56 as cylindrical holes. The embodiment illustrated in FIG. 2B shows an alternate embodiment with plug-receiving holes 54' and 56' as conical holes, receiving conical plugs 24' and 26', with the degree of taper in the conical holes 54' and 56 and conical plugs 24' and 26' not shown to scale. The conical shape of the plug-receiving holes 54' and 56' and the plugs 24' and 26' aids in positioning the plugs 24' and 26' within the plug-receiving holes 54' and 56'. More importantly, the conical shapes may aid in providing a substantially uniform gap between the plugs 24' and 26' and the walls of the holes 54' and 56'. A uniform gap, neither too large nor too small, facilitates the soldering process.

As noted above, the plugs 24 and 26 have respective internally-threaded holes 60 and 62. The internally-threaded holes 60 and 62 are used for threadedly engaging the threaded fasteners 20 and 22. The internally-threaded holes 60 and 62 may be formed in the plugs 24 and 26 either before or after installation of the plugs 24 and 26 in the plug-receiving holes 54 and 56. It is advantageous to form the internally-threaded holes 60 and 62 after installation of the plugs 24 and 26, since alignment of the holes 60 and 62 with the fastener-receiving holes 44 and 46 would otherwise be required. In order to form the internally-threaded holes 60 and 62 after installation of the plugs 24 and 26, first pilot holes are drilled in the plugs 24 and 26, along the fastener-receiving holes 44 and 46. Then the pilot holes are suitably tapped to form the internally-threaded holes 60 and 62.

The plugs 24 and 26 should be made of a relatively ductile material that allows for formation of the internally-threaded holes 60 and 62 in the plugs 24 and 26. Thus a brittle material would be inappropriate as a material for the plugs 60 and 62. Any of a wide variety of metal materials would have suitable strength and ductility characteristics for use as the material for the plugs 24 and 26. Examples include ferrous materials, including a wide range of steels, copper, and brass, and alloys of various metals.

It is also desirable for the plugs 24 and 26 to have a coefficient of thermal expansion that is similar to that of the surrounding first brittle material piece 12. Since materials for optical devices are often chosen for their low coefficients of thermal expansion, it may desirable for the plugs 24 and 26 to have a low coefficient of thermal expansion as well. Iron-nickel alloy materials are suitable for use with brittle materials having low coefficients of thermal expansion. Such materials are sold under the trademark INVAR. Standard INVAR material is an alloy mixture of 64% iron and 36% nickel, and may be referred to generically as FeNi36. Other alloy mixtures of iron and nickel may have other amounts of nickel, for example FeNi39 (having 39% nickel and being sold as INVAR 39) and FeNi42 (having 42% nickel and being sold as INVAR 42). Sometimes other materials, such as one or more of cobalt, carbon, silicon, manganese, copper, aluminum, chromium, and sulfur, are added as part of the iron-nickel alloy material to lower the coefficient of thermal expansion further. Iron-nickel-cobalt alloy materials are sold under the trademark SUPER INVAR. The term "iron-nickel alloy" is used herein to refer generally to alloy materials containing primarily substantial amounts iron and nickel (at least 25% of each), with or without the addition of other materials such as cobalt.

For the brittle materials ZERODUR and ULE, SUPER INVAR iron-nickel-cobalt alloy material has been found to be a suitable material for the plugs 24 and 26. For silicon carbide and silicon, INVAR 39 and INVAR 42 (FeNi39 and FeNi42) have been found to be suitable materials for the plugs 24 and 26.

The plug-receiving holes 54 and 56 may be substantially perpendicular to the corresponding fastener-receiving holes 44 and 46. Securing of the plugs 24 and 26 is improved by placing the plugs 24 and 26 in separated plug-receiving holes 54 and 56, rather than at the ends of the fastener-receiving holes 44 and 46. If the plugs 24 and 26 were placed at the ends of the fastener-receiving holes 44 and 46, only shear forces on the solder would keep them from pulling out of the holes 44 and 46 in response to forces tending to pull the second and third brittle material pieces 14 and 16 away from the first brittle material piece 12. Also, in that configuration only shear forces on the solder would act to keep the plugs 24 and 26 in place while the internally-threaded holes 60 and 62 were being tapped in the plugs 24 and 26. In the illustrated configuration, with the plugs 24 and 26 secured in separate plug-receiving holes 54 and 56, potions of the first brittle material piece press against the plugs 24 and 26 to oppose 1) rotation of the plugs 24 and 26 along axes of the fastener-receiving holes 44 and 46, and 2) extraction of the plugs 24 and 26 through the fastener-receiving holes 44 and 46.

The brittle material structure 10 shown in FIGS. 1-3 illustrates two types of connections between pieces, and an edge-to-flat connection and an edge-to-edge connection. The connection between the first and second brittle material pieces 12 and 14 is an example of an edge-to-flat connection. In the connection, an edge surface 72 of the first brittle material piece 12 abuts a major surface 74 of a tab 76 of the second brittle material piece 14. The fastener 20 is relatively short (shorter than the fastener 22), since the fastener shaft 34 only has to pass through the relatively thin tab 76 and a short length of the fastener-receiving hole 44 to reach the plug 24.

The connection between the first and third brittle material pieces 12 and 16 is an example of an edge-to-edge connection. The edge surface 72 of the first brittle material piece 12 abuts an edge surface 78 of the third brittle material piece 16. The fastener 22 needs to have a relatively long shaft 36 to reach the threaded plug 26.

Although the plug-and-fastener connection and method described may be particularly useful in edge-to-flat connections, it will be appreciated that the connections such as those described herein may be useful in a wide variety of configurations. In addition, it will be appreciated that many of the details of the configurations shown may be varied, if desired. For example, different shapes of the plugs 24 and 26 and/or the plug-receiving holes 54 and 56 may be used. As another example, the fastener-receiving holes 44 and 46 may have a different orientation relative to the plug-receiving holes 54 and 56 than is shown.

Figure 4:
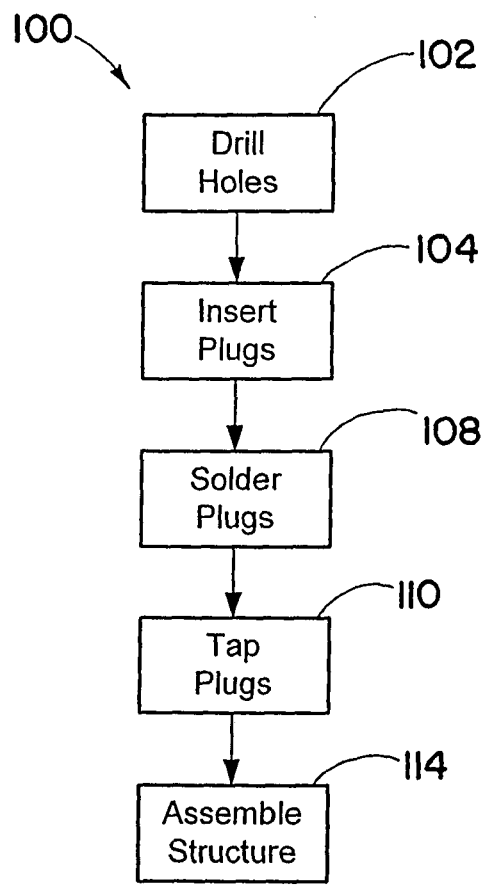
FIG. 4 is a high level flowchart showing steps in a method of making the structure of FIG. 1, in accordance with the present invention.

FIG. 4 shows a high level flowchart of a method 100 for producing and joining together the parts of the brittle material structure 10. In step 102, the holes are drilled in the brittle material pieces 12, 14, and 16. The first brittle material piece 12 has the fastener-receiving holes 44 and 46 and the plug-receiving holes 54 and 56 drilled in it. As noted above, the plug-receiving holes 54 and 56 may be substantially orthogonal to the corresponding plug-receiving holes 54 and 56. Also, the second and third brittle material parts 14 and 16 have their respective through-holes 40 and 42 drilled in them.

In step 104, the plugs 24 and 26 are inserted into the plug-receiving holes 54 and 56. As stated above, the plugs 24 and 26 and/or the plug-receiving holes 54 and 56 may have slight tapers, so as to facilitate their proper placement. Following placement of the plugs 24 and 26, the plugs are soldered to attach them to the first brittle material piece in step 108.

In step 110 the internally-threaded holes 60 and 62 are formed in the plugs 24 and 26. As discussed above, the threaded holes 60 and 62 may be formed by first drilling pilot holes in the plugs 24 and 26, using the fastener-receiving holes 44 and 46 to access the plugs 24 and 26. Then the pilot holes may be tapped to achieve the desired internal thread surface, again with access provided by the fastener-receiving holes 44 and 46.

Finally, in step 114 the brittle material structure 10 is assembled. In doing so the brittle material pieces 14 and 16 are brought into alignment with the first brittle material piece 12. That is, the through-holes 40 and 42 are brought into alignment with the fastener-receiving holes 44 and 46. The threaded fasteners 20 and 22 are then inserted into the through-holes 40 and 42 and the fastener-receiving holes 44 and 46, and are threadedly engaged with the internally-threaded holes 60 and 62 of the plugs 24 and 26.

The system and method described above advantageously allows for secure fastening together of brittle material parts without the shortcomings that may occur with use of adhesives, or with attempts to thread holes in brittle material. The resulting brittle material structure is robustly fastened together, while able to withstand temperature changes without unduly losing alignment or undergoing internal stresses.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A brittle material structure comprising:
 a second brittle material piece; and
 a first brittle material piece fastened to the second material piece;
 wherein the brittle material pieces are fastened together by a threaded fastener that passes through the second brittle material piece and threadedly engages a threaded plug in the first brittle material piece;
 wherein the threaded plug is in a plug-receiving hole in the first brittle material piece;
 wherein the threaded plug is fixedly attached to the first brittle material piece; and
 wherein the brittle material pieces are glass ceramic pieces.

2. The brittle material structure of claim 1, wherein the threaded plug is soldered to the first brittle material piece, within the plug-receiving hole.

3. The brittle material structure of claim 1, wherein the plug-receiving hole in the first brittle material piece is a conical hole.

4. The brittle material structure of claim 1, wherein the brittle material pieces are fastened together with an end surface of the first brittle material surface against a major surface of the second brittle material piece.

5. The brittle material structure of claim 4,
wherein the plug-receiving hole is in a side surface of the first brittle material piece; and
wherein the plug-receiving hole is substantially perpendicular to a fastener-receiving hole in the first brittle material piece.

6. A brittle material structure comprising:
a second brittle material piece; and
a first brittle material piece fastened to the second material piece;
wherein the brittle material pieces are fastened together by a threaded fastener that passes through the second brittle material piece and threadedly engages a threaded plug in the first brittle material piece;
wherein the threaded plug is in a plug-receiving hole in the first brittle material piece;
wherein the threaded plug is fixedly attached to the first brittle material piece;
wherein the brittle material pieces are parts of an optical system; and
wherein one or more of the brittle material pieces are glass ceramic material pieces.

7. The brittle material structure of claim 6, wherein the plug is an iron-nickel-cobalt alloy plug.

8. A brittle material structure comprising:
a second brittle material piece; and
a first brittle material piece fastened to the second material piece;
wherein the brittle material pieces are fastened together by a threaded fastener that passes through the second brittle material piece and threadedly engages a threaded plug in the first brittle material piece;
wherein the threaded plug is in a plug-receiving hole in the first brittle material piece;
wherein the threaded plug is fixedly attached to the first brittle material piece;
wherein the brittle material pieces are parts of an optical system; and
wherein one or more of the brittle material pieces are titanium silicate glass pieces.

9. The brittle material structure of claim 8, wherein the plug is an iron-nickel-cobalt alloy plug.

10. A brittle material structure comprising:
a second brittle material piece; and
a first brittle material piece fastened to the second material piece;
wherein the brittle material pieces are fastened together by a threaded fastener that passes through the second brittle material piece and threadedly engages a threaded plug in the first brittle material piece;
wherein the threaded plug is in a plug-receiving hole in the first brittle material piece;
wherein the threaded plug is fixedly attached to the first brittle material piece;
wherein the brittle material pieces are parts of an optical system; and
wherein one or more of the brittle material pieces one or more of silicon and silicon carbide.

11. The brittle material structure of claim 10, wherein the plug is an iron-nickel alloy plug.

\* \* \* \* \*